United States Patent
Kissel, Jr.

(10) Patent No.: US 8,677,944 B2
(45) Date of Patent: Mar. 25, 2014

(54) UNIVERSAL FOOTWEAR HARNESS SYSTEM FOR PETS

(75) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 119 days.

(21) Appl. No.: 13/468,665

(22) Filed: May 10, 2012

(65) Prior Publication Data
US 2013/0213321 A1 Aug. 22, 2013

Related U.S. Application Data

(60) Provisional application No. 61/600,120, filed on Feb. 17, 2012.

(51) Int. Cl.
*A01K 13/00* (2006.01)

(52) U.S. Cl.
USPC ......................................................... 119/850

(58) Field of Classification Search
USPC ............. 119/850, 792, 726; 54/79.1, 79.2, 82
See application file for complete search history.

(56) References Cited

U.S. PATENT DOCUMENTS

| | | | | |
|---|---|---|---|---|
| 295,712 A * | 3/1884 | Anderson | | 54/80.1 |
| 438,105 A | 10/1890 | Geyer | | |
| 601,974 A * | 4/1898 | Meissner | | 54/82 |
| 665,530 A * | 1/1901 | Johnson | | 168/2 |
| 2,253,837 A * | 8/1941 | Augspurger | | 168/2 |
| 2,443,831 A | 6/1948 | Miller | | |
| 3,742,679 A | 7/1973 | Jordan | | |
| 4,577,591 A * | 3/1986 | Wesseldine | | 604/391 |
| 4,633,817 A * | 1/1987 | Taylor | | 119/850 |
| 4,744,333 A | 5/1988 | Taylor | | |
| 5,076,043 A * | 12/1991 | Butler | | 119/850 |
| 5,184,762 A | 2/1993 | Nevitt | | |
| D376,448 S | 12/1996 | Caditz | | |
| 5,676,095 A * | 10/1997 | Ralls | | 119/850 |
| 6,240,882 B1 * | 6/2001 | Gross | | 119/850 |
| 6,481,383 B1 | 11/2002 | Ross et al. | | |
| 6,564,753 B1 | 5/2003 | Heileg et al. | | |
| 6,851,394 B1 | 2/2005 | Young | | |
| 2008/0173258 A1 * | 7/2008 | Franco | | 119/850 |
| 2011/0017151 A1 * | 1/2011 | Simoni | | 119/850 |

FOREIGN PATENT DOCUMENTS

| | | |
|---|---|---|
| DE | 202005002783 | 1/2006 |
| DE | 102005044595 A1 | 3/2007 |

OTHER PUBLICATIONS

PetsMart, Product Page For "Pet Life 'Double-Ring' Pet Harness with Built-in Velcro Back Pouch" [online], PetsMart [retrieved on Apr. 12, 2012], [retrieved from the Internet]: URL: http://www.petsmart.com/product/index.jsp? productId=12293236&SR=sr3_8755183_go&lmdn=Dog+Collars%2C+Tags+%26amp%3B+Leashes&gclid=CLeFzueNra8CFUPf4Aodsiaapg.

* cited by examiner

*Primary Examiner* — Monica Williams
(74) *Attorney, Agent, or Firm* — GrayRobinson, P.A.; Michael J. Colitz, III

(57) ABSTRACT

Disclosed is a paw pad protector harness that is a lightweight assembly of straps and buckles that is used to hold a variety of pet footwear securely in place for weather condition protection, and for protecting pet paws and legs from exposure to hazardous environments.

7 Claims, 8 Drawing Sheets

UNIVERSAL ADAPTABLE FOOTWEAR
HARNESS SYSTEM FOR PETS

VIEW A-A

DETAIL OF BUCKLE E

VIEW B-B

DETAIL OF BUCKLE F

UNIVERSAL ADAPTABLE FOOTWEAR
HARNESS SYSTEM FOR PETS
ALTERNATIVE BUCKLES AT G AND T

FIRST ALTERNATIVE BUCKLE ASSEMBLY

SECOND ALTERNATIVE BUCKLE ASSEMBLY

FIRST ALTERNATIVE BUCKLE ASSEMBLY AT TVW

SECOND ALTERNATIVE BUCKLE ASSEMBLY AT TVW

UNIVERSAL FOOTWEAR HARNESS SYSTEM FOR PETS

CROSS-REFERENCE TO RELATED APPLICATIONS

This application claims priority to provisional patent application Ser. No. 61/600,120 filed on Feb. 17, 2012 and entitled "Paw Pad Protector Harness." The contents of this co-pending application are fully incorporated herein for all purposes.

TECHNICAL FIELD

This disclosure relates to footwear for pets. More particularly, the present disclosure relates to an adjustable harness system that supports pet footwear.

BACKGROUND OF THE INVENTION

The present invention relates to footwear apparatus designed for the protection of animal feet, specifically the paws of dogs or cats and the method used to hold such footwear in place. There are a variety of socks, boots and other footwear available for pets. Typically there is an elastic band, a draw string, or some sort of strap near the animal's ankle on each leg that can be tightened and is intended to keep the footwear on the foot or leg. Sometimes the footwear is for medical reasons and sometimes it is used to protect the animal from harsh surface conditions, extreme weather conditions, or other exterior environmental hazards such as the salt and chemicals used to melt snow from sidewalks and roadways.

The problem is that such footwear is difficult to keep in place. Dog legs get larger as you move up the leg and get closer to the body. The footwear constraints or fasteners must currently be drawn so tight as to cut off proper circulation to the limb or it becomes uncomfortable. Often the footwear makes it difficult for the animal to walk while wearing because the footwear comes loose and slips partially off. Individual boots are sometimes lost while walking a dog at night.

When an animal has an injury to its paw it can be difficult to keep the animal from chewing at the bandage. The veterinarian sometimes places an awkward cone around the neck of the animal to prevent the animal from turning its head far enough to reach the wounded area and remove the bandage sometimes causing additional damage to the foot or paw.

The background art includes U.S. Pat. Des. 376,448 to Caditz and U.S. Pat. No. 4,744,333 to Taylor. Both of these patents relate to canine footwear. The Caditz design patent illustrates a cover up boot for a canine. There is no reference to or description of the harness or straps which would hold the boot in place. The design illustrates a boot with a buckle attached as a part of the boot. The buckle connector loop appears to be sewn in place at the end of the leg strap. There appears to be no adjustment at the buckle. The Taylor patent provides two embodiments. In both embodiments a buckle is affixed to the footwear. There are two leg straps. Each leg strap connects continuously from the buckle on the left leg to the buckle on the right leg.

In the first Taylor embodiment there is a longitudinal strap that attaches to the two leg suspender straps and the dog collar. It has an adjustment buckle in the middle. The second Taylor embodiment, presumably for smaller dogs, has two suspender straps that cross in the middle and are sewn in place at the crossover. The second embodiment is used in the same manner as the first embodiment but it does not have the longitudinal strap connecting the suspender straps to the collar.

Taylor includes a footwear harness or footwear suspender system that prevents the canine sock, bootie or footwear from coming off. However, it only solves only part of the problem. It can be challenging to get the footwear on and properly adjusted for comfort. There are many types of footwear that may be worn for a variety of purposes or weather conditions. The lengths of footwear vary. Some are elastic. Once a set of footwear has been fitted to a canine it is desirable to be able to quickly remove and quickly replicate placing the footwear back on without having to repeat the fitting and adjusting process. The front feet of a canine are not the same as the back feet. The left side boot may not be the same as the right side boot. Each paw is different. Therefore, each leg strap must have some means to be fitted, labeled or tracked as front or back, left or right. Thus it is desirable to have a leg strap designated for each leg and additional sets of leg straps are required for each set of footwear so fitting and adjustments can be preserved.

There are several problems in the prior art. Connectors of any type with one piece affixed to the footwear present a problem. In Caditz it requires that the harness system must have a compatible connector. In Taylor it requires that the end of the suspender strap must not have a connector. In Caditz the harness system can be used only with a sock or bootie fitted with a compatible connector. This means the pet owner cannot purchase another style of preferred footwear from a competitor unless it uses the same fittings. There are many varieties of connectors and these are not generally available in a hardware store, especially if you only need one side and not the other. In Taylor the suspender strap has no opposing connector.

Another difficulty is presented when the connector is attached to the footwear. Each canine is different, footwear is different, and personal preferences vary. The location where the connector is attached to the footwear may not be the most suitable for fitting and adjusting the footwear to the pet.

On the other hand, even if the Taylor embodiments have a quick snap suspender clamp of any kind attached to the end of the leg strap there might be no adjustment in the strap length, and each time the footwear is removed the properly fitted location of the clamp is lost and must be refitted each time the footwear is again put onto the pet. The Taylor patent does not address these issues. As shown, there is no means for quickly releasing each leg strap individually without losing the adjustment, and the length of the leg strap must be redetermined each time the footwear is put on, and each time a different style of footwear is worn. Adjusting the leg strap at the paw end of the leg strap makes it necessary to readjust the suspender system each time it is worn, and removing the footwear becomes a time consuming process. A pet owner would likely find this to be a cumbersome and time consuming process. The footwear harness system must be easy to put on and take off.

In the prior art as defined by the Taylor embodiments there are just two leg straps for four legs. This means that when the leg straps are attached to the footwear, there is no other way to remove the harness except by disconnecting the footwear from each end of the leg strap. In addition the only place for adjusting the length of the leg strap is at the buckle end where the leg strap is attached to the footwear. One disadvantage this creates is that the adjustment of the leg strap on one leg may affect the adjustment of the leg strap on the opposite end of the leg strap. In addition, the leg strap adjustment applies only to the footwear currently worn. If the pet owner wants to change to another style footwear, needs to replace a worn out sock, or wants to wash the footwear then the leg strap adjustment must be lost so the footwear can be removed. In adjusting either elastic footwear or elastic leg straps it is a matter of practice to determine an adequate amount of tension on the footwear, while leaving enough additional stretch so the leg strap harness system can flex with the movement of a running, rolling, jumping, or sitting dog. A two strap system does not allow quick release and quick connecting of the leg straps without losing some or all of the footwear adjustment.

The two strap system as shown in the prior art presents these additional constraints. Suppose the footwear has a slip buckle attached as shown in Taylor. The leg strap must have a plain straight end in order to use the slip buckle. However, the plain end leg strap cannot be connected to any other footwear unless such other footwear has a connector attached to it such that it can be attached to a plain end leg strap. If footwear has a connector such as shown by Caditz the one side of the coupling connector is attached to the sock. The other side of the coupling is attached to the leg strap. This limits the use of this harness system only to footwear with couplings that are compatible with the opposite side of the coupling connector attached to the strap.

The universal footwear harness of the present disclosure is aimed at overcoming these and other shortcomings present in the background art.

SUMMARY OF THE INVENTION

Therefore, it is an objective of this disclosure to provide a device to hold animal footwear in place without slipping partially or entirely off, without interfering with the animal's walking movement, and without being so tightly strapped around the ankle or leg as to restrict proper circulation or becoming uncomfortable.

It is also an object of the present disclosure to provide a device that is easy to use, can be adjusted to the individual pet, and fitted to the pet in little time and with minimal effort.

It is an objective of this disclosure to be able to adjust the footwear connectors and length of each leg strap just one time, that being the first time it is worn.

It is an objective of this disclosure to provide a footwear harness system that can be removed in a few seconds without losing adjustment, and can be put back on again with minimal effort and to not have to repeat the adjustment process.

It is an objective of this disclosure to provide a universal footwear harness system that can be used interchangeably on any sock, bootie, legwarmer, or any other footwear whether the footwear has permanent buckle connectors attached permanently or whether the footwear has no connectors.

It is an object of this disclosure to provide a universal footwear harness system that allows each leg strap to be adjusted individually for each style or type of footwear worn, to be adjusted one time, thereafter the leg strap can remain attached to the footwear even when the leg strap is removed from the harness and from the pet.

It is an objective of this disclosure to provide quick disconnect and quick connect buckles for each leg strap.

These and other objectives are accomplished via a universally adaptable pet footwear harness system that is compatible with pet footwear designs of all types made by any footwear manufacturer. The harness system consists of a center strap that runs along the back of the pet from near the tail end on one end and connects with the collar on the other end. There are four separate individually detachable leg straps that attach to each of four pieces of footwear. The center strap is available in various lengths, various materials, widths, fabrics or colors. The webbing may be elastic, non-elastic or a combination.

In one embodiment, a purchaser selects a center strap length for their pet, color, width and then decides on elastic, non-elastic or a combination. Next the length of leg straps for the front legs, and then for the back legs are selected along with color and type of materials. The double sided quick connect slip adjustment buckles at the junction of the center strap with the rear leg straps and front leg straps are standard. The top end of all leg straps are plain until attached to the male side of these quick connect/disconnect buckles. The ends of the leg straps that attach to the footwear offer many options. The footwear end of a leg strap may be bifurcated so it can be attached to the footwear in two places, or it may be a singular strap end.

The footwear end or ends of a leg strap may be plain, they may have a quick snap suspender type clip that attaches directly to any part of the footwear, they may be sewn directly to the footwear, or they may have one side of a quick connecting buckle device that is compatible with an opposite side of the quick connecting buckle device.

Each leg strap is associated with a specific piece of footwear. It is intended that a leg strap is attached to a piece of footwear and adjusted to the leg, leg straps and footwear remain together except perhaps for washing, repair or replacement.

Thus in the universal system a pet owner may have a set of mesh elastic socks attached to leg straps with quick connect suspender clamps; and a set of boots with two slip buckles which attach to the bifurcated plain ends of another set of leg straps and also a set of lightweight booties with rubberized pads that have leg straps permanently sewn to the booties.

All these variations are compatible with the universal footwear harness system because the plain ends of the leg straps that connect to the center strap all slide into a standard male connector that allows adjusting the leg strap length. The male connector is compatible with a standard double sided female connector buckle with a quick connect/quick release button that releases leg straps simultaneously on both sides.

The double sided quick connect/quick release buckle over the front legs has an integral slip buckle that allows it to be adjusted either direction along the center strap after it is connected to the collar so it can be positioned as desired above the front legs.

The double sided quick connect/disconnect buckle at the tail end of the center strap has an integral slip buckle on the center strap side that allows adjusting the length of the center strap to the length of the back of the pet as well as flexible positioning of the buckle over the hind legs to receive the rear leg straps.

All leg straps can be instantly disconnected and reconnected at the center strap without disturbing any adjustments or connector positioning on any of the straps or footwear. The system provides maximum flexibility, adaptability and convenience for the pet owner.

Various embodiments of the invention may have none, some, or all of these advantages. Other technical advantages of the present invention will be readily apparent to one skilled in the art.

DETAILED DESCRIPTION OF THE INVENTION

Figure 1:
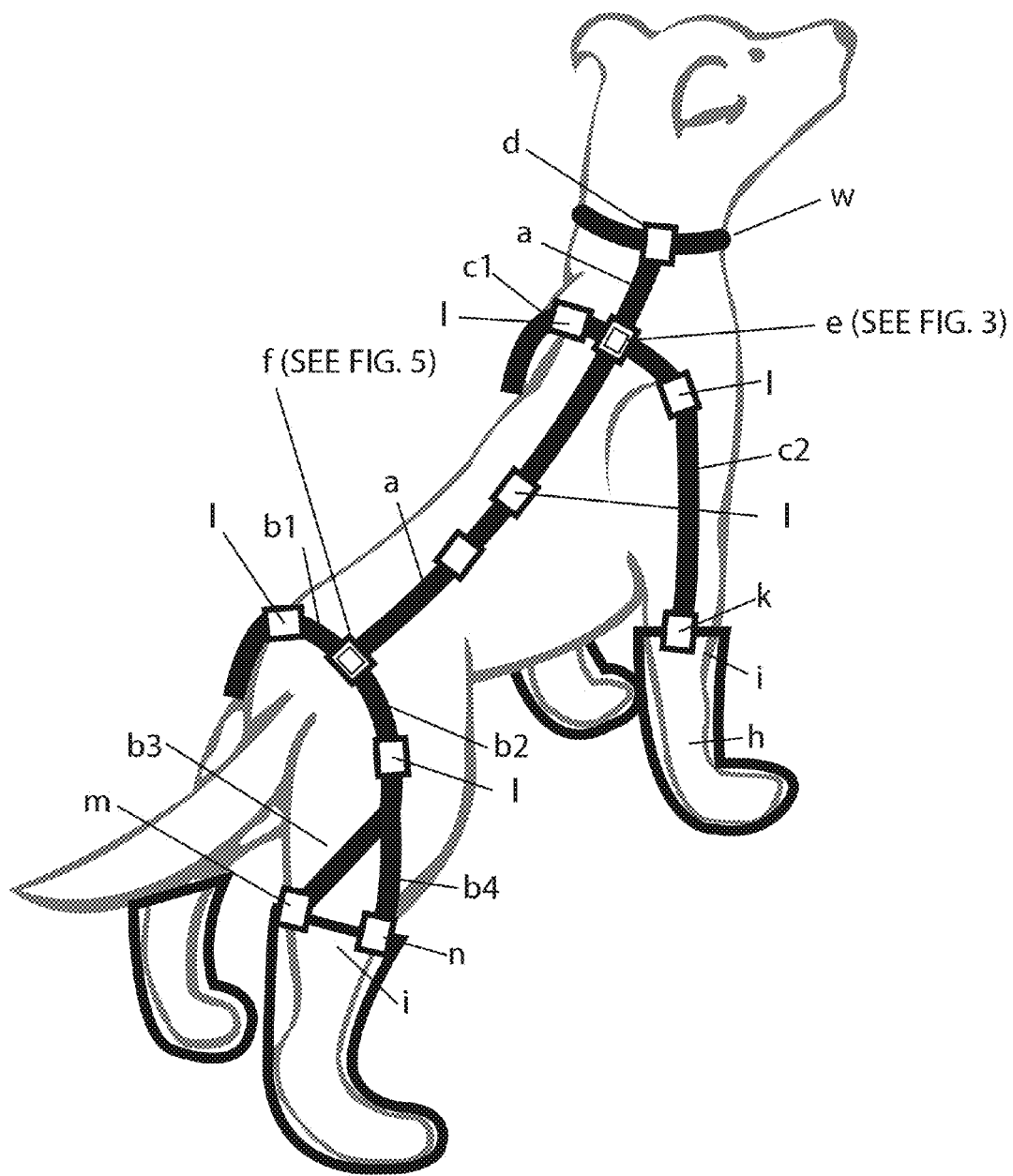
FIG. 1 is a perspective view of a dog wearing a harness in accordance with the present disclosure.
Figure 2:
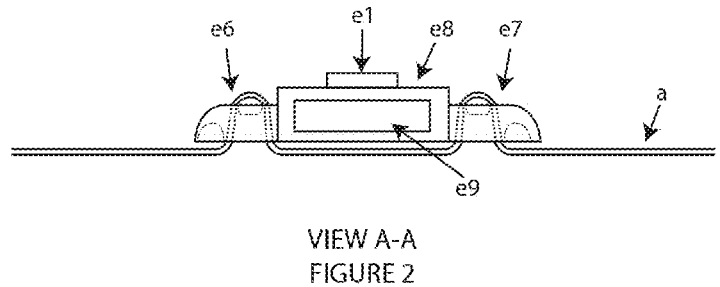
FIG. 2 is a side elevational view of a buckle arrangement taken along line A-A of FIG. 3.

The universal adaptable footwear harness system for pets as illustrated in FIG. 1 consists of a center strap (a), two individual front leg straps (c1, c2), two individual rear leg straps (b1, b2) that bifurcate into branches (b3, b4) at the footwear end on both of the rear leg straps. Center strap (a) begins at rear leg connecter (f), continues through front leg connector (e) and attaches to the dog collar (w) with a suspender clamp (d). The suspender clamp can be a hinged type clamp that is spring biased into a closed position. The two halves of the clamp can include teeth to grab onto fabric between the opposing halves. The upper leg ends of the front and rear leg straps connect to the center strap at quick connect/disconnect adjustable connector assemblies (e, f). Although footwear (h) is part of the harness system, the pet owner may purchase any style or type of footwear from any manufacturer for any purpose with any type of harness connector fitting or with no provision for a harness fitting at all. The customer has complete freedom to choose any preferred footwear. All of them are workable with the universal adaptable footwear harness system for pets.

Figure 3:
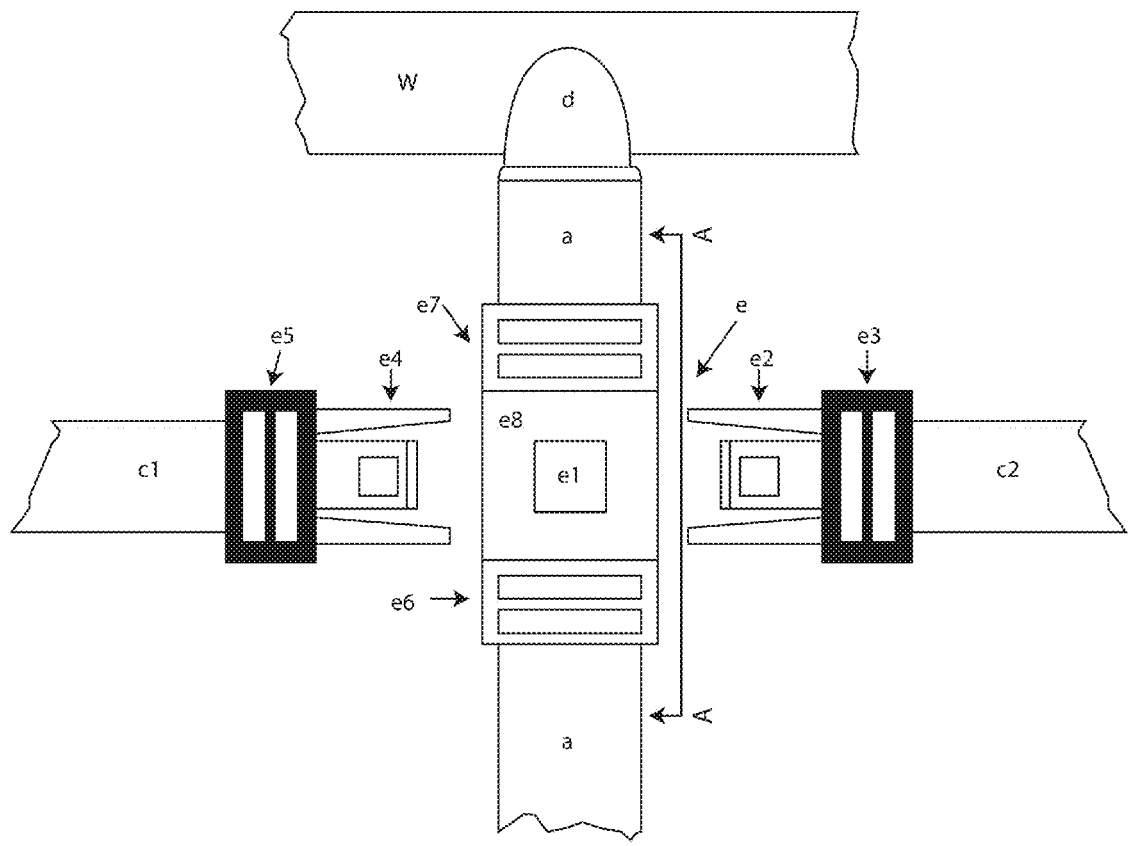
FIG. 3 is a plan view of a buckle arrangement.
Figure 4:
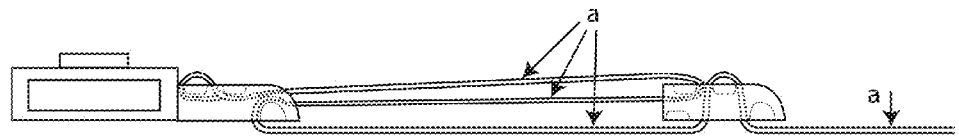
FIG. 4 is a side elevational view of a buckle arrangement taken along line B-B of FIG. 5.

The front legs quick connect/disconnect adjustable connector assembly (e) shown in FIG. 3. Quick connect/disconnect assemblies disclosed herein may take the form of a conventional side release buckle. In one embodiment, the female element may have two diametrically opposed openings for independently retaining two male elements. In another embodiment, the female element may have four openings about its periphery for independently retaining four male buckle elements. Strap adjusters can be integrated into the female and/or male buckle elements. In the depicted embodiment, the structural frame (e8) has openings on two opposite sides for insertion of adjustable leg strap buckle connectors (e2, e4) into the frame (e8). The connectors automatically lock in place. The connectors can be instantly and simultaneously released by pressing the quick release trigger (button or lever) (e1) in the center of frame (e8).

The adjustable leg strap buckle connectors (e2, e4) include slip lock tension buckles (e3, e5). The slip tension buckles can take the form of a conventional strap adjuster. The plain end of each upper leg strap is inserted into the slot nearest the frame (e8), doubles back through the outer slot, and is pulled until it provides the desired length and tension for securing the already attached footwear onto each front leg. After this adjustment is made the connector may be connected and released over and over without requiring readjustment. The footwear may be removed and put on with an unlimited consistent fit.

The front legs quick connect/disconnect adjustable connector assembly (e) includes two slip lock tension buckles (e6, e7) attached to the frame (e8) one on each side, that secure the connector assembly (e) to the center strap (a) and also allows for sliding the connector assembly (e) either direction along the center strap (a). This allows optimal positioning of the connector assembly (e) above the front legs and simultaneously establishes the proper length of the collar end of center strap (a).

There are many styles and variations of the quick connect/disconnect connector (e) components (e1, e2, e3, e4, e5 and e8) available. Only one type would be selected for use with this harness system.

Figure 6:
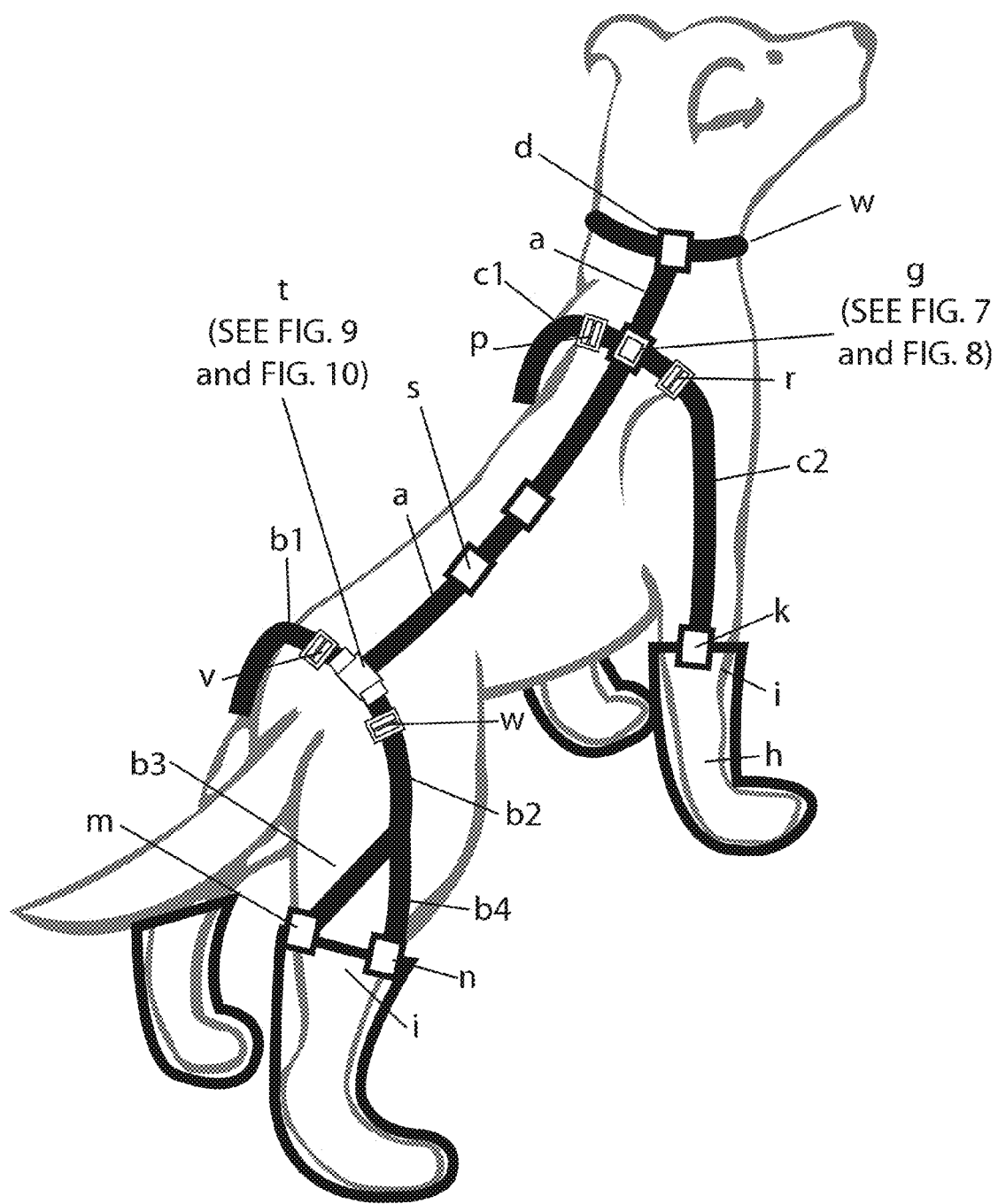
FIG. 6 is a perspective view of a dog wearing an alternative harness in accordance with the present disclosure.
Figure 7:
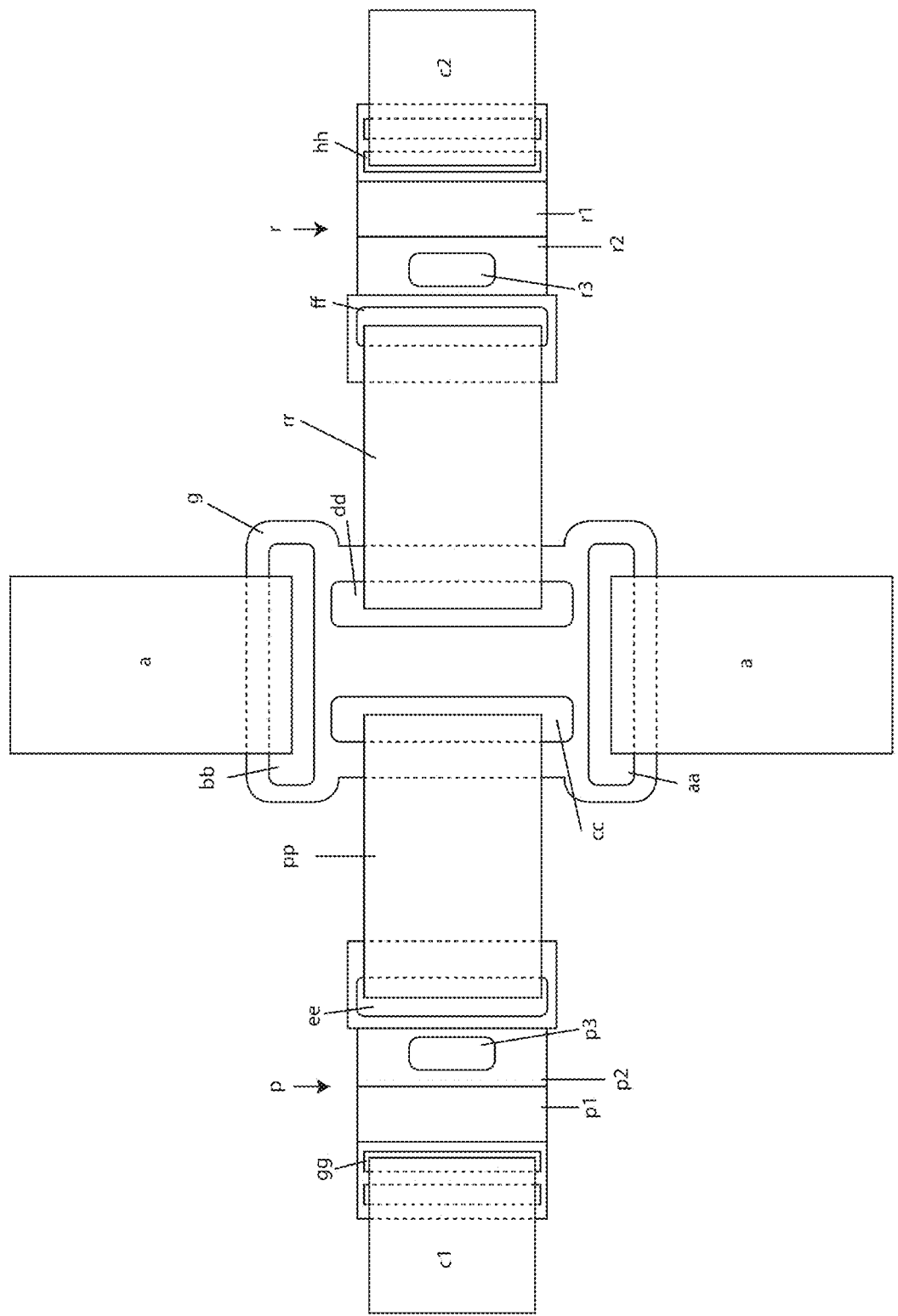
FIG. 7 is a plan view of an alternative buckle arrangement in accordance with the present disclosure.

In FIGS. 6 and 7 the front legs quick connect/disconnect adjustable connector assembly (g, r, p) identified in FIG. 1 as component (e) and by detail in FIG. "B" is shown with components (e) replaced by alternative four way slip lock connector (g) and two separate single strap quick connect/disconnect connectors (p, r) connected to (g) with sewn buckle straps (pp, rr). The components in FIG. 7 provide the same results as component (e) in FIG. 1.

Figure 8:
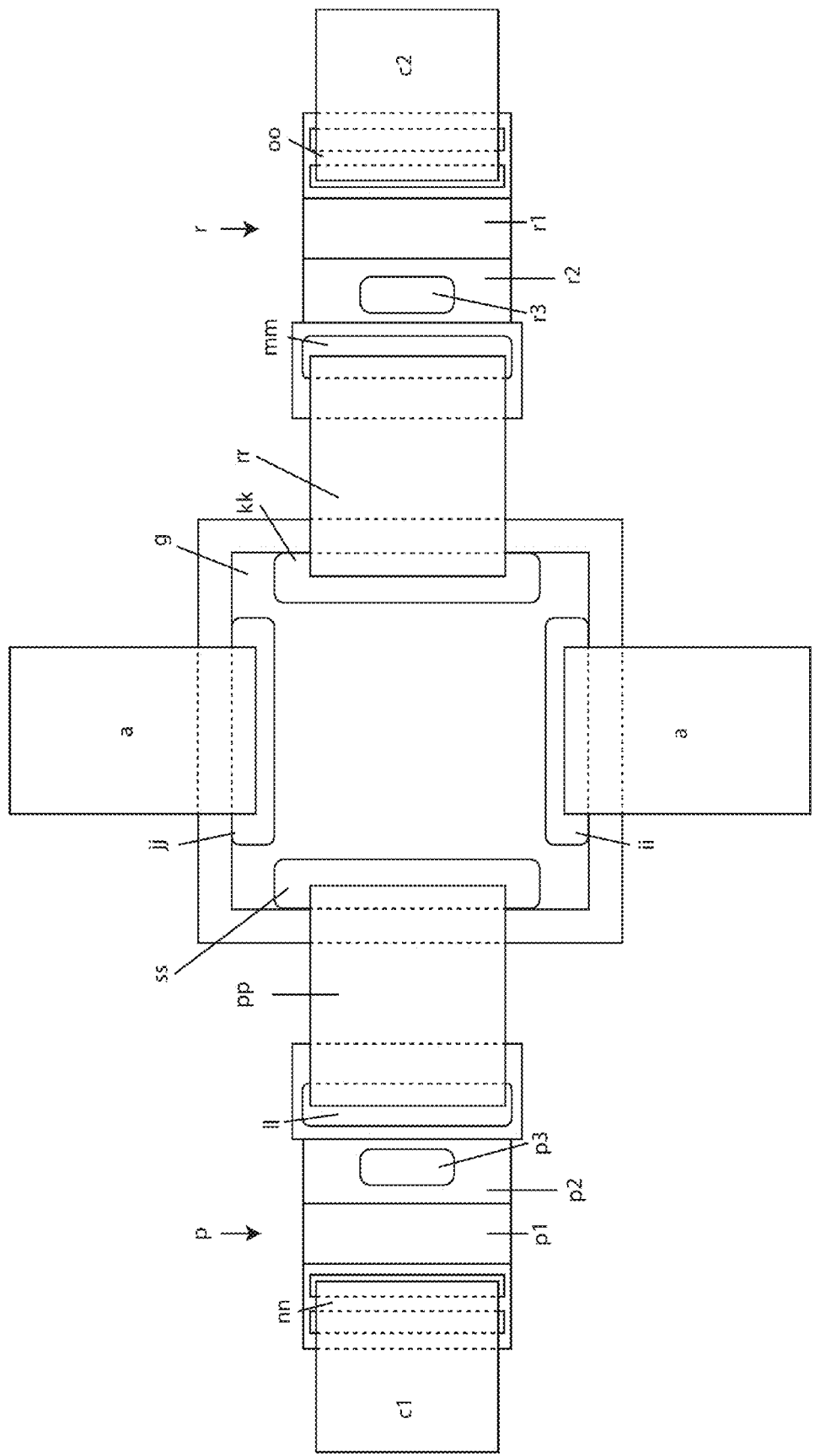
FIG. 8 is a plan view of an alternative buckle arrangement in accordance with the present disclosure.

In FIG. 8 is another alternative embodiment to component (e) shown in FIGS. 1 and 3. In FIG. 8 the alternative four way slip lock connector (g) is a symmetrical square with four symmetrical slip lock slots (ii, jj, kk, ss) connected to single strap quick connect/disconnect connectors (p) and (r) with sewn buckle straps (pp, rr).

In both FIGS. 7 and 8 the single strap quick connect/disconnect connectors (p) and (r) are connected to front leg straps (c1) and (c2). It is understood there can be other styles of four way slip lock connectors (g) as shown in FIGS. 7 and 8 which serve the same function of adjusting the junction position of the front leg straps (c1, c2) along the center strap (a). It is also understood there can be many styles of single strap quick connect/disconnect connectors (p) and (r) as shown in FIGS. 7 and 8 which serve the same purposes of connecting front leg straps (c1) and (c2) to the center strap (a) while also providing slip lock tension buckles (hh, gg, nn, oo) that allow for adjusting the length of leg straps (c1, c2) to the individual pet and to the particular style of footwear.

The rear legs quick connect/disconnect adjustable connector assembly (f) is identical to (e) (FIGS. 1 and 5) in every way and is used the same way with the exception that it has only one three bar slip lock tension buckle (f2) attached to the frame (f7), on the center strap (a) side. This component does two things. The buckle attaches the connector assembly (f) to center strap (a), and it allows for center strap (a) to be pulled through the buckles (f2 and s) for adjusting the length of the center strap and positions the connector assembly (f) in the most suitable position for applying tension and angular adjustment to the rear leg straps (b1, b2).

After the center strap (a) is pulled through slip tension lock buckle (f2) the plain loose end is fed through a four bar adjustable tension lock buckle (s). This additional buckle allows the center strap (a) to be looped back to the buckle (f2) a second time, which means that moving buckle (s) one inch will shorten center strap (a) by two inches. The advantage of this is it allows a greater range of adjustment for a greater range of back lengths. If (s) is eliminated, the buckle (f2) still allows adjustment of strap (a). All the loose ends of leg straps and the center strap slide into a keeper (l) after adjustments are complete.

Figure 5:
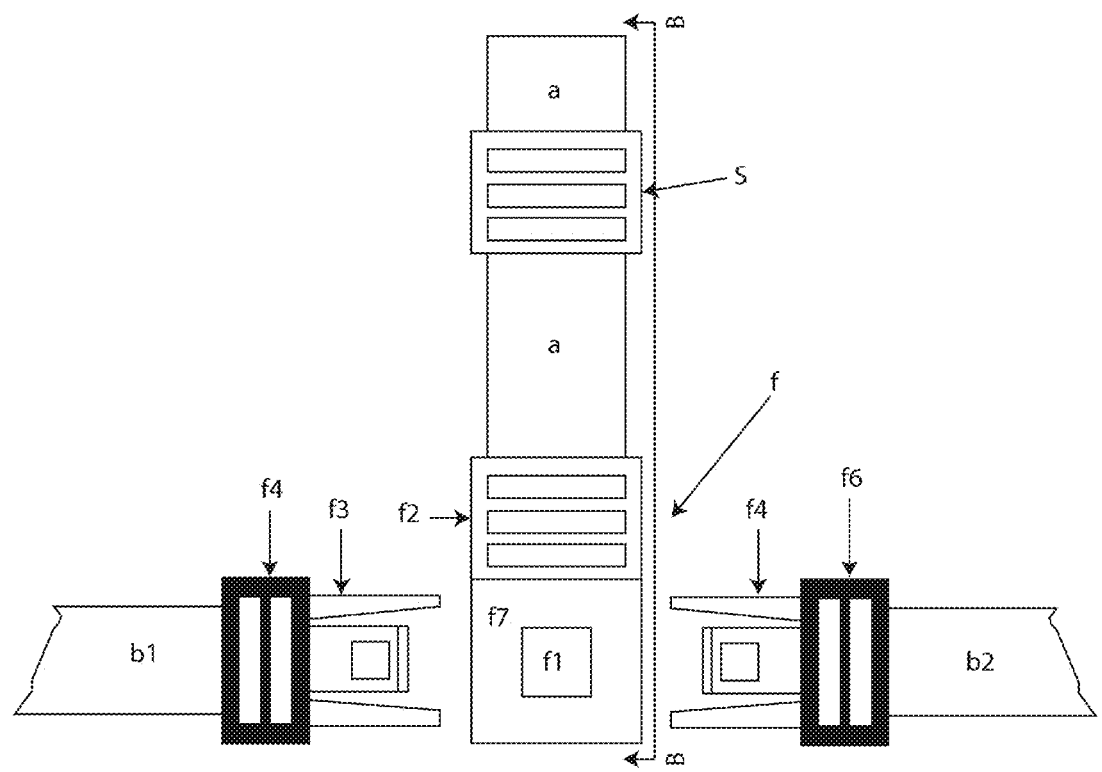
FIG. 5 is a plan view of an alternative buckle arrangement.
Figure 9:
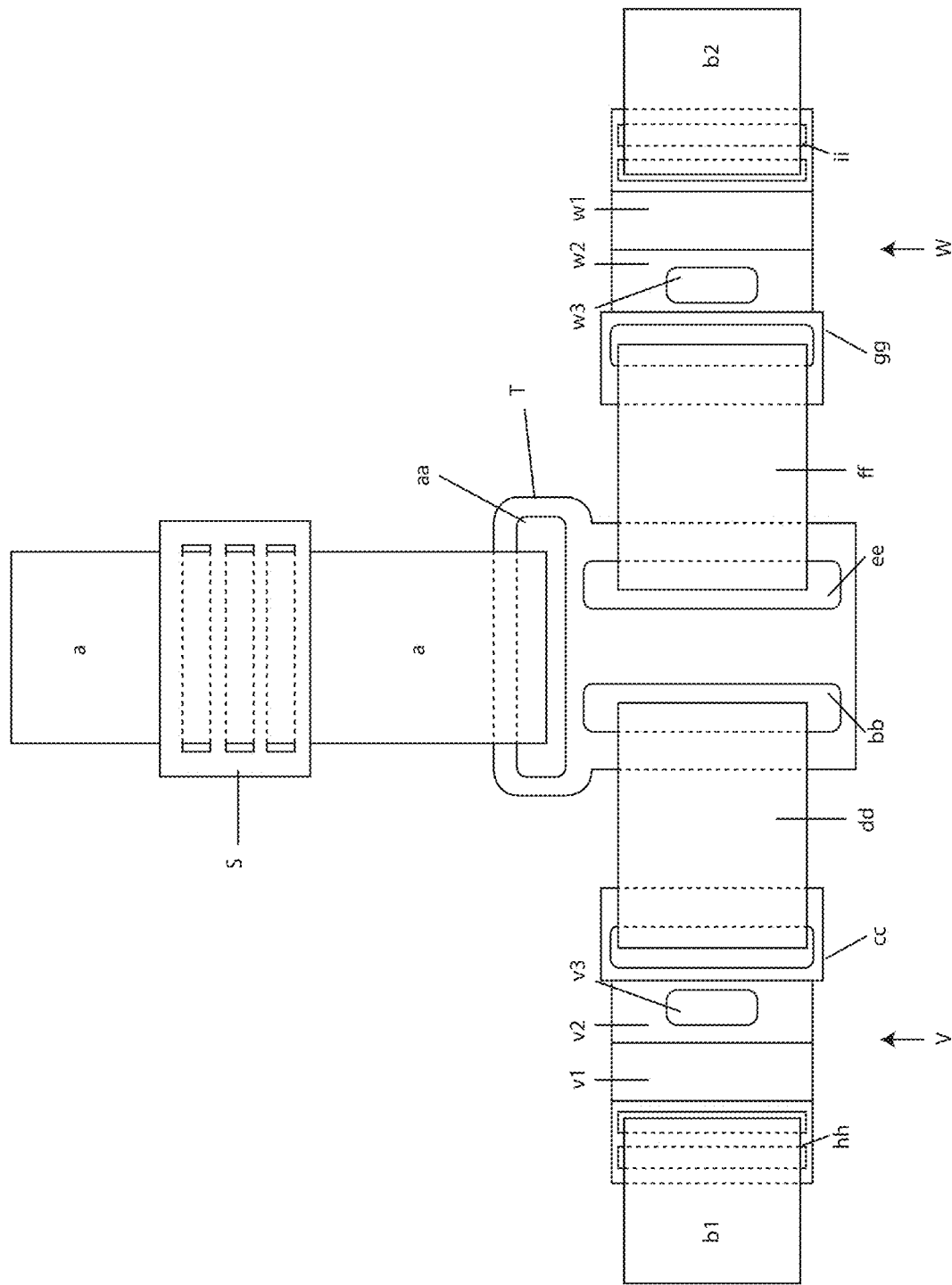
FIG. 9 is a plan view of an alternative buckle arrangement in accordance with the present disclosure.

In FIGS. 6 and 9 the rear legs quick connect/disconnect adjustable connector assembly (t, v, w) identified in FIG. 1 as component (f) and by detail in FIG. 5 is shown with component (f) replaced by an alternative three way slip lock connector (t) and two separate single strap quick connect/disconnect connectors (v, w) connected to (t) with sewn buckle straps (dd, gg). The tail end of the leg straps (a) passes through slot (aa) of the three way slip lock connector at the junction of rear leg straps (b1, b2) with center strap (a) and then passes through the four bar adjustable tension lock buckle (s). This attaches center strap (a) to the three way slip lock connector (t) and also allows for adjusting the overall length of center strap (a) to the size of the pet and allows for preferred positioning of the junction over the rear hip of the pet. The components in FIG. 9 provide the same results as component (f) in FIG. 1.

Figure 10:
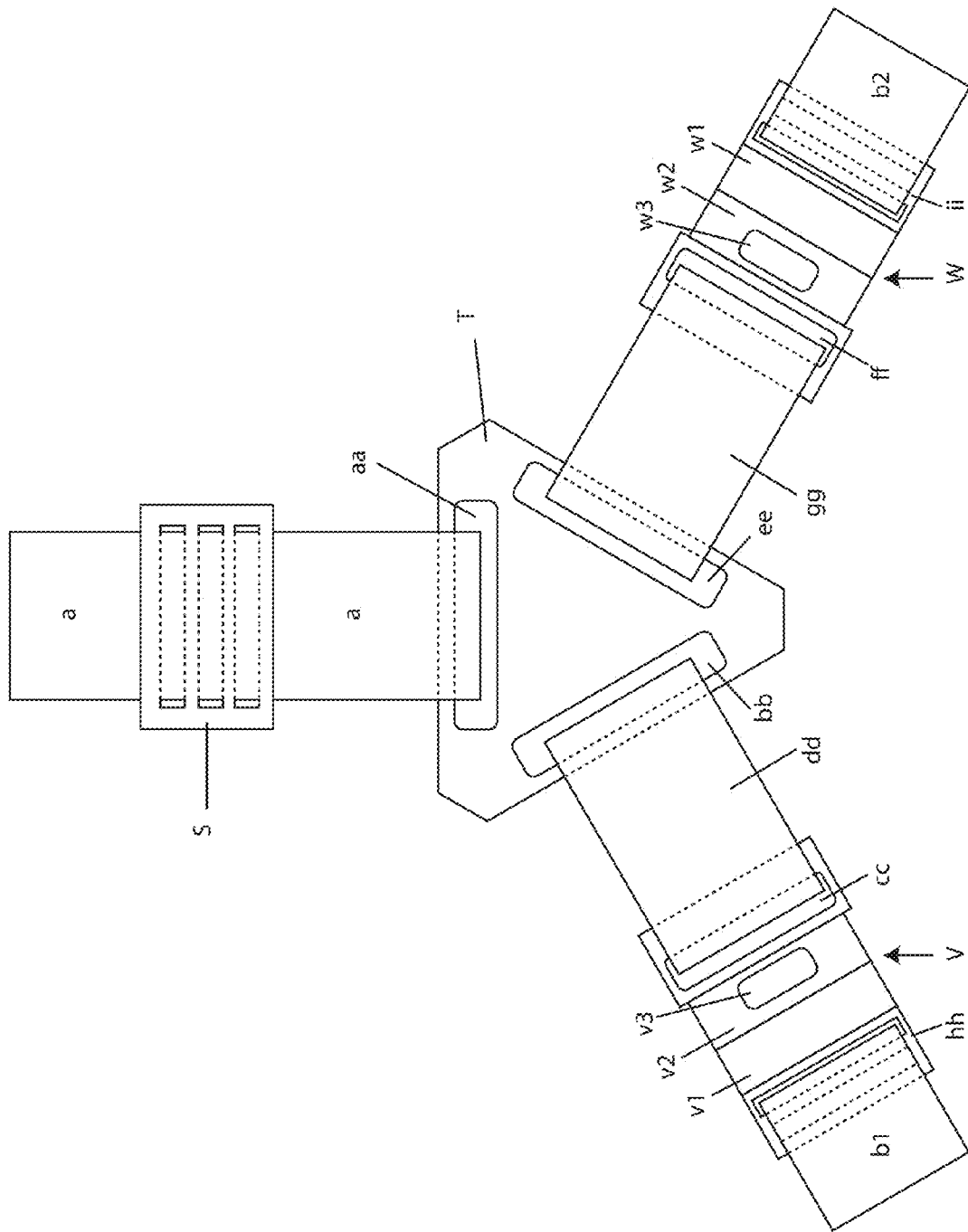
FIG. 10 is a plan view of an alternative buckle arrangement in accordance with the present disclosure.

In FIG. 10 is another alternative embodiment to component (f) shown in FIGS. 1 and 5. In FIG. 10 the alternative three way slip lock connector (t) is a symmetrical triangular configuration with three symmetrical slots (aa, bb, ee) connected to single strap quick connect/disconnect connectors (v, w) with sewn buckle straps (dd, gg). In both FIGS. 9 and 10 the single strap quick connect/disconnect connectors (v) and (w) are connected to rear leg straps (b1) and (b2).

It is understood there can be other styles of three way slip lock connectors (t) as shown in FIGS. 9 and 10 which serve the same function of creating a junction of rear leg straps (b1, b2) with center strap (a) while also serving as a terminal loop for returning the leg strap back through the four bar adjustable tension lock buckle (s) to provide for center strap length and positioning adjustments. It is also understood there can be other styles of single strap quick connect/disconnect connectors (v, w) as shown in FIGS. 9 and 10 which serve the same purpose of connecting rear leg straps (b1) and (b2) to the center strap (a) while also providing slip lock tension buckles (ii, hh) that allow for adjusting the length of the leg straps (b1, b2) to the individual pet and to the particular style of footwear.

A pet owner may purchase any length or type of center strap, and any length, type or quantity of leg straps. If a customer intends to use three different sets of footwear then they would buy three pair of front leg straps and three pair of rear leg straps but only one center strap. Either front leg straps or back leg straps are available bifurcated or plain single end. All leg straps include the quick connect/quick release adjustable leg strap buckle connectors (e2, e3, e4, 45, f3, f4, f5, and f6). The customer may select or specify the way the footwear connector end of the leg strap is to be finished such as style or choice of fasteners.

In the preferred embodiment of this invention the footwear connectors (m, n, and k) at the footwear connector end of leg straps (c1, and c2) and (b1, and b2 at ends of bifurcated branch legs b3, b4, b5, and b6) is a simple sewn on suspender clamp (m, n, and k). The upper rim of footwear (h) may be reinforced at (i).

The leg strap footwear connector ends with suspender clamps can be readily attached to all styles of footwear. If the footwear has a connecting device already attached such as in Taylor or Caditz the suspender clamp can be attached somewhere next to these devices on the footwear and if the customer prefers the unwanted connecting device can be cut off or the customer can cut off the suspender clamp from the leg strap and sew on the matching connector side of the device attached to the footwear. Either of these three alternatives work just as well.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An adjustable harness system for a pet, the pet having paws, two front legs, two hind legs, and a back, the harness system comprising:
    a center strap positioned along the back of the pet, the center strap having forward and rearward ends, a first female quick connect buckle adjustably positioned along the forward end of the center strap, a second female quick connect buckle adjustably positioned along the rearward end of the center strap;
    a pair of front leg straps positioned along the two front legs of the pet, each front leg strap including an upper and a lower end, a male quick connect buckle secured to the upper end of each front leg strap via a slip lock assembly, whereby the male quick connect buckle can be adjustably positioned along the length of the associated front leg strap, a suspender type clamp secured to the lower end of each front leg strap, the male quick connect buckle of each front leg strap being releasably secured to the first female quick connect buckle;
    a pair of hind leg straps positioned along the two hind legs of the pet, each hind leg strap including an upper end and a bifurcated lower end, a male quick connect buckle secured to the upper end of each hind leg strap via a slip lock assembly, whereby the male quick connect buckle can be adjustably positioned along the length of the associated hind leg strap, a suspender type clamp secured to the lower end of each hind leg strap, the male quick connect buckle of each hind leg strap being releasably secured to the second female quick connect buckle;
    four socks, each sock positioned over one of the paws of the pet, the suspender type clamps of the front and rear leg straps being releasably secured to each sock, thereby preventing the sock from being displaced.

2. The adjustable harness system as described in claim 1 wherein the first and second female quick connect buckles are each secured to the center strap via a slip lock assembly.

3. An adjustable harness for a pet, the pet having paws, legs, and a back, the harness comprising:
    a center strap positioned along the back of the pet, the center strap having forward and rearward ends, a first quick connect buckle adjustably positioned along the center strap;
    a pair of leg straps positioned along the legs of the pet, each leg strap including an upper and a lower end, a second quick connect buckle secured to the upper end of each leg strap via a slip lock assembly, whereby the second quick connect buckle can be adjustably positioned along the length of the associated leg strap, the second quick connect buckle of each leg strap being releasably secured to the first quick connect buckle;
    two socks, each sock positioned over one of the paws of the pet, the lower ends of each of the leg straps being secured to each sock, thereby preventing the sock from being displaced.

4. The adjustable harness as described in claim 3 further comprising:
    a third quick disconnect buckle assembly adjustably positioned along the rearward end of the center strap;
    a second pair of leg straps positioned along two legs of the pet, each leg strap including upper and lower ends, a fourth quick disconnected buckle connected to each upper end and secured to the third quick disconnect buckle assembly, a slip lock assembly connected to each upper end, the slip lock assembly permitting each fourth quick disconnect buckle to be adjustably positioned along the length of the associated leg strap.

5. The adjustable harness as described in claim 4 wherein the lower end of each of the second pair of leg straps is bifurcated.

6. The adjustable harness as described in claim 3 wherein a suspender type clamp is used to secure the socks to the lower ends of the leg straps.

7. The adjustable harness as described in claim 3 further comprising a collar and wherein the center strap is secured to the collar via a suspender clamp.

* * * * *